US008345890B2

(12) United States Patent
Avendano et al.

(10) Patent No.: US 8,345,890 B2
(45) Date of Patent: Jan. 1, 2013

(54) SYSTEM AND METHOD FOR UTILIZING INTER-MICROPHONE LEVEL DIFFERENCES FOR SPEECH ENHANCEMENT

(75) Inventors: Carlos Avendano, Campbell, CA (US); Peter Santos, Los Altos, CA (US); Lloyd Watts, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 1592 days.

(21) Appl. No.: 11/343,524

(22) Filed: Jan. 30, 2006

(65) Prior Publication Data

US 2007/0154031 A1 Jul. 5, 2007

Related U.S. Application Data

(60) Provisional application No. 60/756,826, filed on Jan. 5, 2006.

(51) Int. Cl.
*H04B 15/00* (2006.01)

(52) U.S. Cl. ....................................................... 381/94.3

(58) Field of Classification Search .................... 381/91, 381/92, 95, 110, 122, 94.1, 94.2, 94.3, 94.7; 704/226, 233, 275, 227

See application file for complete search history.

(56) References Cited

U.S. PATENT DOCUMENTS 3,976,863 A 8/1976 Engel
3,978,287 A 8/1976 Fletcher et al.
4,137,510 A 1/1979 Iwahara
4,433,604 A 2/1984 Ott
4,516,259 A 5/1985 Yato et al.
4,535,473 A 8/1985 Sakata
4,536,844 A 8/1985 Lyon
4,581,758 A 4/1986 Coker et al.
4,628,529 A 12/1986 Borth et al.
4,630,304 A 12/1986 Borth et al.
4,649,505 A 3/1987 Zinser, Jr. et al.
4,658,426 A 4/1987 Chabries et al.
4,674,125 A 6/1987 Carlson et al.
4,718,104 A 1/1988 Anderson (Continued)

FOREIGN PATENT DOCUMENTS

JP 62110349 5/1987

(Continued)

OTHER PUBLICATIONS

Steven F. Boll, "Suppression of Acoustic Noise in Speech Using Spectral Subtraction", Dept. of Computer Science, University of Utah Salt Lake City, Utah, Apr. 1979, pp. 18-19.*

(Continued)

*Primary Examiner* — Yuwen Pan
*Assistant Examiner* — Kile Blair
(74) *Attorney, Agent, or Firm* — Carr & Ferrell LLP

(57) ABSTRACT

Systems and methods for utilizing inter-microphone level differences to attenuate noise and enhance speech are provided. In exemplary embodiments, energy estimates of acoustic signals received by a primary microphone and a secondary microphone are determined in order to determine an inter-microphone level difference (ILD). This ILD in combination with a noise estimate based only on a primary microphone acoustic signal allow a filter estimate to be derived. In some embodiments, the derived filter estimate may be smoothed. The filter estimate is then applied to the acoustic signal from the primary microphone to generate a speech estimate.

21 Claims, 4 Drawing Sheets

U.S. PATENT DOCUMENTS

| | | | |
|---|---|---|---|
| 4,811,404 A | 3/1989 | Vilmur et al. | |
| 4,812,996 A | 3/1989 | Stubbs | |
| 4,864,620 A | 9/1989 | Bialick | |
| 4,920,508 A | 4/1990 | Yassaie et al. | |
| 5,027,410 A | 6/1991 | Williamson et al. | |
| 5,054,085 A | 10/1991 | Meisel et al. | |
| 5,058,419 A | 10/1991 | Nordstrom et al. | |
| 5,099,738 A | 3/1992 | Hotz | |
| 5,119,711 A | 6/1992 | Bell et al. | |
| 5,142,961 A | 9/1992 | Paroutaud | |
| 5,150,413 A | 9/1992 | Nakatani et al. | |
| 5,175,769 A | 12/1992 | Hejna, Jr. et al. | |
| 5,187,776 A | 2/1993 | Yanker | |
| 5,208,864 A | 5/1993 | Kaneda | |
| 5,210,366 A | 5/1993 | Sykes, Jr. | |
| 5,224,170 A | 6/1993 | Waite, Jr. | |
| 5,230,022 A | 7/1993 | Sakata | |
| 5,319,736 A | 6/1994 | Hunt | |
| 5,323,459 A | 6/1994 | Hirano | |
| 5,341,432 A | 8/1994 | Suzuki et al. | |
| 5,381,473 A | 1/1995 | Andrea et al. | |
| 5,381,512 A | 1/1995 | Holton et al. | |
| 5,400,409 A | 3/1995 | Linhard | |
| 5,402,493 A | 3/1995 | Goldstein | |
| 5,402,496 A | 3/1995 | Soli et al. | |
| 5,471,195 A | 11/1995 | Rickman | |
| 5,473,702 A | 12/1995 | Yoshida et al. | |
| 5,473,759 A | 12/1995 | Slaney et al. | |
| 5,479,564 A | 12/1995 | Vogten et al. | |
| 5,502,663 A | 3/1996 | Lyon | |
| 5,536,844 A | 7/1996 | Wijesekera | |
| 5,544,250 A | 8/1996 | Urbanski | |
| 5,574,824 A | 11/1996 | Slyh et al. | |
| 5,583,784 A | 12/1996 | Kapust et al. | |
| 5,587,998 A | 12/1996 | Velardo, Jr. et al. | |
| 5,590,241 A * | 12/1996 | Park et al. | 704/227 |
| 5,602,962 A | 2/1997 | Kellermann | |
| 5,675,778 A | 10/1997 | Jones | |
| 5,682,463 A | 10/1997 | Allen et al. | |
| 5,694,474 A | 12/1997 | Ngo et al. | |
| 5,706,395 A | 1/1998 | Arslan et al. | |
| 5,717,829 A | 2/1998 | Takagi | |
| 5,729,612 A | 3/1998 | Abel et al. | |
| 5,732,189 A | 3/1998 | Johnston et al. | |
| 5,749,064 A | 5/1998 | Pawate et al. | |
| 5,757,937 A | 5/1998 | Itoh et al. | |
| 5,792,971 A | 8/1998 | Timis et al. | |
| 5,796,819 A | 8/1998 | Romesburg | |
| 5,806,025 A | 9/1998 | Vis et al. | |
| 5,809,463 A | 9/1998 | Gupta et al. | |
| 5,825,320 A | 10/1998 | Miyamori et al. | |
| 5,839,101 A | 11/1998 | Vahatalo et al. | |
| 5,920,840 A | 7/1999 | Satyamurti et al. | |
| 5,933,495 A | 8/1999 | Oh | |
| 5,943,429 A | 8/1999 | Handel | |
| 5,956,674 A | 9/1999 | Smyth et al. | |
| 5,974,380 A | 10/1999 | Smyth et al. | |
| 5,978,824 A | 11/1999 | Ikeda | |
| 5,983,139 A | 11/1999 | Zierhofer | |
| 5,990,405 A | 11/1999 | Auten et al. | |
| 6,002,776 A | 12/1999 | Bhadkamkar et al. | |
| 6,061,456 A | 5/2000 | Andrea et al. | |
| 6,072,881 A | 6/2000 | Linder | |
| 6,097,820 A | 8/2000 | Turner | |
| 6,108,626 A | 8/2000 | Cellario et al. | |
| 6,122,610 A | 9/2000 | Isabelle | |
| 6,134,524 A | 10/2000 | Peters et al. | |
| 6,137,349 A | 10/2000 | Menkhoff et al. | |
| 6,140,809 A | 10/2000 | Doi | |
| 6,173,255 B1 | 1/2001 | Wilson et al. | |
| 6,216,103 B1 | 4/2001 | Wu et al. | |
| 6,222,927 B1 | 4/2001 | Feng et al. | |
| 6,223,090 B1 | 4/2001 | Brungart | |
| 6,226,616 B1 | 5/2001 | You et al. | |
| 6,263,307 B1 | 7/2001 | Arslan et al. | |
| 6,266,633 B1 | 7/2001 | Higgins et al. | |
| 6,317,501 B1 | 11/2001 | Matsuo | |
| 6,339,758 B1 | 1/2002 | Kanazawa et al. | |
| 6,355,869 B1 | 3/2002 | Mitton | |
| 6,363,345 B1 | 3/2002 | Marash et al. | |
| 6,381,570 B2 | 4/2002 | Li et al. | |
| 6,430,295 B1 | 8/2002 | Handel et al. | |
| 6,434,417 B1 | 8/2002 | Lovett | |
| 6,449,586 B1 | 9/2002 | Hoshuyama | |
| 6,469,732 B1 | 10/2002 | Chang et al. | |
| 6,487,257 B1 | 11/2002 | Gustafsson et al. | |
| 6,496,795 B1 | 12/2002 | Malvar | |
| 6,513,004 B1 | 1/2003 | Rigazio et al. | |
| 6,516,066 B2 | 2/2003 | Hayashi | |
| 6,529,606 B1 | 3/2003 | Jackson, Jr. II et al. | |
| 6,549,630 B1 | 4/2003 | Bobisuthi | |
| 6,584,203 B2 | 6/2003 | Elko et al. | |
| 6,622,030 B1 | 9/2003 | Romesburg et al. | |
| 6,717,991 B1 | 4/2004 | Gustafsson et al. | |
| 6,718,309 B1 | 4/2004 | Selly | |
| 6,738,482 B1 | 5/2004 | Jaber | |
| 6,760,450 B2 | 7/2004 | Matsuo | |
| 6,785,381 B2 | 8/2004 | Gartner et al. | |
| 6,792,118 B2 | 9/2004 | Watts | |
| 6,795,558 B2 | 9/2004 | Matsuo | |
| 6,798,886 B1 | 9/2004 | Smith et al. | |
| 6,810,273 B1 | 10/2004 | Mattila et al. | |
| 6,882,736 B2 | 4/2005 | Dickel et al. | |
| 6,915,264 B2 | 7/2005 | Baumgarte | |
| 6,917,688 B2 | 7/2005 | Yu et al. | |
| 6,944,510 B1 | 9/2005 | Ballesty et al. | |
| 6,978,159 B2 | 12/2005 | Feng et al. | |
| 6,982,377 B2 | 1/2006 | Sakurai et al. | |
| 6,999,582 B1 | 2/2006 | Popovic et al. | |
| 7,016,507 B1 | 3/2006 | Brennan | |
| 7,020,605 B2 | 3/2006 | Gao | |
| 7,031,478 B2 | 4/2006 | Belt et al. | |
| 7,054,452 B2 | 5/2006 | Ukita | |
| 7,065,485 B1 | 6/2006 | Chong-White et al. | |
| 7,076,315 B1 | 7/2006 | Watts | |
| 7,092,529 B2 | 8/2006 | Yu et al. | |
| 7,092,882 B2 | 8/2006 | Arrowood et al. | |
| 7,099,821 B2 | 8/2006 | Visser et al. | |
| 7,142,677 B2 | 11/2006 | Gonopolskiy | |
| 7,146,316 B2 | 12/2006 | Alves | |
| 7,155,019 B2 | 12/2006 | Hou | |
| 7,164,620 B2 | 1/2007 | Hoshuyama | |
| 7,171,008 B2 | 1/2007 | Elko | |
| 7,171,246 B2 | 1/2007 | Mattila et al. | |
| 7,174,022 B1 | 2/2007 | Zhang et al. | |
| 7,206,418 B2 | 4/2007 | Yang et al. | |
| 7,209,567 B1 | 4/2007 | Kozel et al. | |
| 7,225,001 B1 | 5/2007 | Eriksson et al. | |
| 7,242,762 B2 | 7/2007 | He et al. | |
| 7,246,058 B2 | 7/2007 | Burnett | |
| 7,254,242 B2 | 8/2007 | Ise et al. | |
| 7,359,520 B2 | 4/2008 | Brennan et al. | |
| 7,412,379 B2 | 8/2008 | Taori et al. | |
| 7,433,907 B2 | 10/2008 | Nagai et al. | |
| 7,555,434 B2 | 6/2009 | Nomura et al. | |
| 7,617,099 B2 * | 11/2009 | Yang et al. | 704/228 |
| 7,949,522 B2 | 5/2011 | Hetherington et al. | |
| 8,098,812 B2 | 1/2012 | Fadili et al. | |
| 2001/0016020 A1 | 8/2001 | Gustafsson et al. | |
| 2001/0031053 A1 | 10/2001 | Feng et al. | |
| 2002/0002455 A1 | 1/2002 | Accardi et al. | |
| 2002/0009203 A1 | 1/2002 | Erten | |
| 2002/0041693 A1 | 4/2002 | Matsuo | |
| 2002/0080980 A1 | 6/2002 | Matsuo | |
| 2002/0106092 A1 | 8/2002 | Matsuo | |
| 2002/0116187 A1 | 8/2002 | Erten | |
| 2002/0133334 A1 | 9/2002 | Coorman et al. | |
| 2002/0147595 A1 | 10/2002 | Baumgarte | |
| 2002/0184013 A1 | 12/2002 | Walker | |
| 2003/0014248 A1 | 1/2003 | Vetter | |
| 2003/0026437 A1 | 2/2003 | Janse et al. | |
| 2003/0033140 A1 | 2/2003 | Taori et al. | |
| 2003/0039369 A1 | 2/2003 | Bullen | |
| 2003/0040908 A1 | 2/2003 | Yang et al. | |
| 2003/0061032 A1 | 3/2003 | Gonopolskiy | |
| 2003/0063759 A1 | 4/2003 | Brennan et al. | |
| 2003/0072382 A1 | 4/2003 | Raleigh et al. | |

| | | | |
|---|---|---|---|
| 2003/0072460 | A1 | 4/2003 | Gonopolskiy et al. |
| 2003/0095667 | A1 | 5/2003 | Watts |
| 2003/0099345 | A1 | 5/2003 | Gartner et al. |
| 2003/0101048 | A1 | 5/2003 | Liu |
| 2003/0103632 | A1 | 6/2003 | Goubran et al. |
| 2003/0128851 | A1 | 7/2003 | Furuta |
| 2003/0138116 | A1 | 7/2003 | Jones et al. |
| 2003/0147538 | A1 | 8/2003 | Elko |
| 2003/0169891 | A1 | 9/2003 | Ryan et al. |
| 2003/0228023 | A1 | 12/2003 | Burnett |
| 2004/0013276 | A1 | 1/2004 | Ellis et al. |
| 2004/0047464 | A1 | 3/2004 | Yu et al. |
| 2004/0057574 | A1 | 3/2004 | Faller |
| 2004/0078199 | A1 | 4/2004 | Kremer et al. |
| 2004/0131178 | A1 | 7/2004 | Shahaf et al. |
| 2004/0133421 | A1 | 7/2004 | Burnett et al. |
| 2004/0165736 | A1 | 8/2004 | Hetherington et al. |
| 2004/0196989 | A1 | 10/2004 | Friedman et al. |
| 2004/0263636 | A1 | 12/2004 | Cutler et al. |
| 2005/0025263 | A1 | 2/2005 | Wu |
| 2005/0027520 | A1 | 2/2005 | Mattila et al. |
| 2005/0049864 | A1 | 3/2005 | Kaltenmeier et al. |
| 2005/0060142 | A1 | 3/2005 | Visser et al. |
| 2005/0152559 | A1 | 7/2005 | Gierl et al. |
| 2005/0185813 | A1 | 8/2005 | Sinclair et al. |
| 2005/0213778 | A1 | 9/2005 | Buck et al. |
| 2005/0216259 | A1 | 9/2005 | Watts |
| 2005/0228518 | A1 | 10/2005 | Watts |
| 2005/0276423 | A1 | 12/2005 | Aubauer et al. |
| 2005/0288923 | A1 | 12/2005 | Kok |
| 2006/0072768 | A1 | 4/2006 | Schwartz et al. |
| 2006/0074646 | A1 | 4/2006 | Alves et al. |
| 2006/0098809 | A1 | 5/2006 | Nongpiur et al. |
| 2006/0120537 | A1 | 6/2006 | Burnett et al. |
| 2006/0133621 | A1* | 6/2006 | Chen et al. .................... 381/92 |
| 2006/0149535 | A1 | 7/2006 | Choi et al. |
| 2006/0160581 | A1 | 7/2006 | Beaugeant et al. |
| 2006/0184363 | A1 | 8/2006 | McCree et al. |
| 2006/0198542 | A1 | 9/2006 | Benjelloun Touimi et al. |
| 2006/0222184 | A1 | 10/2006 | Buck et al. |
| 2007/0021958 | A1 | 1/2007 | Visser et al. |
| 2007/0027685 | A1 | 2/2007 | Arakawa et al. |
| 2007/0033020 | A1 | 2/2007 | (Kelleher) Francois et al. |
| 2007/0067166 | A1 | 3/2007 | Pan et al. |
| 2007/0078649 | A1 | 4/2007 | Hetherington et al. |
| 2007/0094031 | A1 | 4/2007 | Chen |
| 2007/0100612 | A1 | 5/2007 | Ekstrand et al. |
| 2007/0116300 | A1 | 5/2007 | Chen |
| 2007/0150268 | A1 | 6/2007 | Acero et al. |
| 2007/0154031 | A1 | 7/2007 | Avendano et al. |
| 2007/0165879 | A1 | 7/2007 | Deng et al. |
| 2007/0195968 | A1 | 8/2007 | Jaber |
| 2007/0230712 | A1 | 10/2007 | Belt et al. |
| 2007/0276656 | A1 | 11/2007 | Solbach et al. |
| 2008/0019548 | A1 | 1/2008 | Avendano |
| 2008/0033723 | A1 | 2/2008 | Jang et al. |
| 2008/0140391 | A1 | 6/2008 | Yen et al. |
| 2008/0201138 | A1 | 8/2008 | Visser et al. |
| 2008/0228478 | A1 | 9/2008 | Hetherington et al. |
| 2008/0260175 | A1* | 10/2008 | Elko ........................... 381/73.1 |
| 2009/0012783 | A1 | 1/2009 | Klein |
| 2009/0012786 | A1 | 1/2009 | Zhang et al. |
| 2009/0129610 | A1 | 5/2009 | Kim et al. |
| 2009/0220107 | A1 | 9/2009 | Every et al. |
| 2009/0238373 | A1 | 9/2009 | Klein |
| 2009/0253418 | A1 | 10/2009 | Makinen |
| 2009/0271187 | A1 | 10/2009 | Yen et al. |
| 2009/0323982 | A1 | 12/2009 | Solbach et al. |
| 2010/0094643 | A1 | 4/2010 | Avendano et al. |
| 2010/0278352 | A1 | 11/2010 | Petit et al. |
| 2011/0178800 | A1 | 7/2011 | Watts |
| 2012/0121096 | A1 | 5/2012 | Chen et al. |
| 2012/0140917 | A1 | 6/2012 | Nicholson et al. |

FOREIGN PATENT DOCUMENTS

| | | |
|---|---|---|
| JP | 04184400 | 7/1992 |
| JP | 5053587 | 3/1993 |
| JP | 05-172865 | 7/1993 |
| JP | 06269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004010415 | 1/2004 |
| WO | 2007/081916 | 7/2007 |
| WO | 2007/114003 | 12/2007 |
| WO | 2007/140003 | 12/2007 |
| WO | 2010/005493 | 1/2010 |

OTHER PUBLICATIONS

Stahl, V.; Fischer, A.; Bippus, R.; "Quantile based noise estimation for spectral subtraction and Wiener filtering," Acoustics, Speech, and Signal Processing, 2000. ICASSP '00. Proceedings. 2000 IEEE International Conference on, vol. 3, No., pp. 1875-1878 vol. 3, 2000.*

Avendano, Carlos, "Frequency-Domain Source Identification and Manipulation in Stereo Mixes for Enhancement, Suppression and Re-panning Applications," 2003 IEEE Workshop on Applications of Signal Processing to Audio and Acoustics, Oct. 19-22, 2003, pp. 55-58, New Paltz, New York, USA.

Widrow, B. et al., "Adaptive Atenna Systems," Dec. 1967, pp. 2143-2159, vol. 55 No. 12, Proceedings of the IEEE.

Elko, Gary W., "Differential Microphone Arrays," Audio Signal Processing for Next-Generation Multimedia Communication Systems, 2004, pp. 12-65, Kluwer Academic Publishers, Norwell, Massachusetts, USA.

Marc Moonen et al. "Multi-Microphone Signal Enhancement Techniques for Noise Suppression and Dereverberation," source(s): http://www.esat.kuleuven.ac.be/sista/yearreport97/node37.html.

Steven Boll et al. "Suppression of Acoustic Noise in Speech Using Two Microphone Adaptive Noise Cancellation", source(s): IEEE Transactions on Acoustic, Speech, and Signal Processing. vol. v ASSP-28, n 6, Dec. 1980, pp. 752-753.

Chen Liu et al. "A two-microphone dual delay-line approach for extraction of a speech sound in the presence of multiple interferers", source(s): Acoustical Society of America. vol. 110, 6, Dec. 2001, pp. 3218-3231.

Cohen et al. "Microphone Array Post-Filtering for Non-Stationary Noise", source(s): IEEE. May 2002.

Jingdong Chen et al. "New Insights into the Noise Reduction Wiener Filter", source(s): IEEE Transactions on Audio, Speech, and Langauge Processing. vol. 14, 4, Jul. 2006, pp. 1218-1234.

Rainer Martin et al. "Combined Acoustic Echo Cancellation, Dereverberation and Noise Reduction: A two Microphone Approach", source(s): Annales des Telecommunications/Annals of Telecommunications. vol. 29, 7-8, Jul.-Aug. 1994, pp. 429-438.

Mitsunori Mizumachi et al. "Noise Reduction by Paired-Microphones Using Spectral Subtraction", source(s): 1998 IEEE. pp. 1001-1004.

Lucas Parra et al. "Convolutive blind Separation of Non-Stationary", source(s): IEEE Transactions on Speech and Audio Processing. vol. 8, 3, May 2008, pp. 320-327.

Isreal Cohen. "Multichannel Post-Filtering in Nonstationary Noise Environment", source(s): IEEE Transactions on Signal Processing. vol. 52, 5, May 2004, pp. 1149-1160.

R.A. Goubran. "Acoustic Noise Suppression Using Regressive Adaptive Filtering", source(s): 1990 IEEE. pp. 48-53.

Ivan Tashev et al. "Microphone Array of Headset with Spatial Noise Suppressor", source(s): http://research.microsoft.com/users/ivantash/Documents/Tashev_MAforHeadset_HSCMA_05.pdf. (4 pages).

Martin Fuchs et al. "Noise Suppression for Automotive Applications Based on Directional Information", source(s): 2004 IEEE. pp. 237-240.
Jean-Marc Valin et al. "Enhanced Robot Audition Based on Microphone Array Source Separation with Post-Filter", source(s): Proceedings of 2004 IEEE/RSJ International Conference on Intelligent Robots and Systems, Sep. 28-Oct. 2, 2004, Sendai, Japan. pp. 2123-2128.
Jont B. Allen. "Short Term Spectral Analysis, Synthesis, and Modification by Discrete Fourier Transform", IEEE Transactions on Acoustics, Speech, and Signal Processing. vol. ASSP-25, 3. Jun. 1977. pp. 235-238.
Jont B. Allen et al. "A Unified Approach to Short-Time Fourier Analysis and Synthesis", Proceedings of the IEEE. vol. 65, 11, Nov. 1977. pp. 1558-1564.
C. Avendano, "Frequency-Domain Techniques for Source Identification and Manipulation in Stereo Mixes for Enhancement, Suppression and Re-Panning Applications," in Proc. IEEE Workshop on Application of Signal Processing to Audio and Acoustics, Waspaa, 03, New Paltz, NY, 2003.
B. Widrow et al., "Adaptive Antenna Systems," Proceedings IEEE, vol. 55, No. 12, pp. 2143-2159, Dec. 1967.
Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.
Boll, Steven "Supression of Acoustic Noise in Speech using Spectral Subtraction", source(s): IEEE Transactions on Acoustics, Speech and Signal Processing, vol. ASSP-27, No. 2, Apr. 1979, pp. 113-120.
Dahl et al., "Simultaneous Echo Cancellation and Car Noise Suppression Employing a Microphone Array", source(s): IEEE, 1997, pp. 239-382.
"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.
Fulghum et al., "LPC Voice Digitizer with Background Noise Suppression", source(s): IEEE, 1979, pp. 220-223.
Graupe et al., "Blind Adaptive Filtering of Speech form Noise of Unknown Spectrum Using Virtual Feedback Configuration", source(s): IEEE, 2000, pp. 146-158.
Haykin, Simon et al. "Appendix A.2 Complex Numbers." Signals and Systems. @nd ed. 2003. p. 764.
Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time Domain Digital Cochlear Model", IEEE Transactions on Signal Proccessing, Dec. 1991, vol. 39, No. 12, pp. 2573-2592.
Martin, R "Spectral subtraction based on minimum statistics," in Proc. Eur. Signal Processing Conf., 1994, pp. 1182-1185.
Mitra, Sanjit K. Digital Signal Processing: a Computer-based Approach. 2nd ed. 2001. pp. 131-133.
Narrative of Prior Disclosure of Audio Display, Feb. 15, 2000.
Cosi, P. et al (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Rabiner, Lawrence R. et al. Digital Processing of Speech Signals (Prentice-Hall Series in Signal Processing). Upper Saddle River, NJ: Prentice Hall, 1978.
Weiss, Ron et al, Estimating single-channel source separation masks:revelance vector machine classifiers vs. pitch-based masking. Workshop on Statistical and Preceptual Audio Processing, 2006.
Schimmel, Steven et al., "Coherent Envelope Detection for Modulation Filtering of Speech," ICASSP 2005,I-221-1224, 2005 IEEE.
Slaney, Malcom, "Lyon's Cochlear Model", Advanced Technology Group, Apple Technical Report #13, AppleComputer, Inc., 1988, pp. 1-79.
Slaney, Malcom, et al. (1994). "Auditory model inversion for sound separation," Proc. of IEEE Intl. Conf. on Acous., Speech and Sig. Proc., Sydney, vol. II, 77-80.
Slaney, Malcom. "An Introduction to Auditory Model Inversion," Interval Technical Report IRC 1994-014, http://coweb.ecn.purdue.edu/~maclom/interval/1994-014/,Sep. 1994.
Solbach, Ludger "An Architecture for Robust Partial Tracking and Onset Localization in Single Channel Audio Signal Mixes", Tuhn Technical University, Hamburg and Harburg, ti6 Verteilte Systeme, 1998.
Syntrillium Software Corporation, "Cool Edit User's Manual," 1996, pp. 1-74.
Tchorz et al., "SNR Estimation Based on Amplitude Modulation Analysis with Applications to Noise Suppression", source(s): IEEE Transactions on Speech and Audio Processing, vol. 11, No. 3, May 2003, pp. 184-192.
Watts, "Robust Hearing Systems for Intelligent Machines," Applied Neurosystems Corporation, 2001, pp. 1-5.
Yoo et al., "Continuous-Time Audio Noise Suppression and Real-Time Implementation", source(s): IEEE, 2002, pp. IV3980-IV3983.
International Search Report dated Jun. 8, 2001 in Application No. PCT/US01/08372.
International Search Report dated Apr. 3, 2003 in Application No. PCT/US02/36946.
International Search Report dated May 29, 2003 in Application No. PCT/US03/04124.
International Search Report and Written Opinion dated Sep. 16, 2008 in Application No. PCT/US07/12628.
International Search Report and Written Opinion dated May 11, 2009 in Application No. PCT/US09/01667.
International Search Report and Written Opinion dated May 20, 2010 in Application No. PCT/US09/06754.
US Reg. No. 2,875,755 (Aug. 17, 2004).
Lippmann, Richard P. "Speech Recognition by Machines and Humans", Speech Communication 22(1997) 1-15, 1997 Elseiver Science B.V.
International Search Report and Written Opinion dated Aug. 27, 2009 in Application No. PCT/US09/03813.
International Search Report and Written Opinion dated Oct. 19, 2007 in Application No. PCT/US07/00463.
International Search Report and Written Opinion dated Oct. 1, 2008 in Application No. PCT/US08/08249.
International Search Report and Written Opinion dated Apr. 9, 2008 in Application No. PCT/US07/21654.

* cited by examiner

SYSTEM AND METHOD FOR UTILIZING INTER-MICROPHONE LEVEL DIFFERENCES FOR SPEECH ENHANCEMENT

CROSS-REFERENCE TO RELATED APPLICATION

This application claims the priority and benefit of U.S. Provisional Patent Application Ser. No. 60/756,826, filed January 5, 2006, and entitled "Inter-Microphone Level Difference Suppressor," which is incorporated herein by reference.

BACKGROUND OF THE INVENTION

Presently, there are numerous methods for reducing background noise in speech recordings made in adverse environments. One such method is to use two or more microphones on an audio device. These microphones are localized and allow the device to determine a difference between the microphone signals. For example, due to a space difference between the microphones, the difference in times of arrival of the signals from a speech source to the microphones may be utilized to localize the speech source. Once localized, the signals can be spatially filtered to suppress the noise originating from different directions.

Beamforming techniques utilizing a linear array of microphones may create an "acoustic beam" in a direction of the source, and thus can be used as spatial filters. This method, however, suffers from many disadvantages. First, it is necessary to identify the direction of the speech source. The time delay, however, is difficult to estimate due to such factors as reverberation which may create ambiguous or incorrect information. Second, the number of sensors needed to achieve adequate spatial filtering is generally large (e.g., more than two). Additionally, if the microphone array is used on a small device, such as a cellular phone, beamforming is more difficult at lower frequencies because the distance between the microphones of the array is small compared to the wavelength.

Spatial separation and directivity of the microphones provides not only arrival-time differences but also inter-microphone level differences (ILD) that can be more easily identified than time differences in some applications. Therefore, there is a need for a system and method for utilizing ILD for noise suppression and speech enhancement.

SUMMARY OF THE INVENTION

Embodiments of the present invention overcome or substantially alleviate prior problems associated with noise suppression and speech enhancement. In general, systems and methods for utilizing inter-microphone level differences (ILD) to attenuate noise and enhance speech are provided. In exemplary embodiments, the ILD is based on energy level differences.

In exemplary embodiments, energy estimates of acoustic signals received from a primary microphone and a secondary microphone are determined for each channel of a cochlea frequency analyzer for each time frame. The energy estimates may be based on a current acoustic signal and an energy estimate of a previous frame. Based on these energy estimates the ILD may be calculated.

The ILD information is used to determine time-frequency components where speech is likely to be present and to derive a noise estimate from the primary microphone acoustic signal. The energy and noise estimates allow a filter estimate to be derived. In one embodiment, a noise estimate of the acoustic signal from the primary microphone is determined based on minimum statistics of the current energy estimate of the primary microphone signal and a noise estimate of the previous frame. In some embodiments, the derived filter estimate may be smoothed to reduce acoustic artifacts.

The filter estimate is then applied to the cochlea representation of the acoustic signal from the primary microphone to generate a speech estimate. The speech estimate is then converted into time domain for output. The conversion may be performed by applying an inverse frequency transformation to the speech estimate.

DESCRIPTION OF EXEMPLARY EMBODIMENTS

The present invention provides exemplary systems and methods for recording and utilizing inter-microphone level differences to identify time frequency regions dominated by speech in order to attenuate background noise and far-field distractors. Embodiments of the present invention may be practiced on any communication device that is configured to receive sound such as, but not limited to, cellular phones, phone handsets, headsets, and conferencing systems. Advantageously, exemplary embodiments are configured to provide improved noise suppression on small devices where prior art microphone arrays will not function well. While embodiments of the present invention will be described in reference to operation on a cellular phone, the present invention may be practiced on any communication device.

Figure 1A:
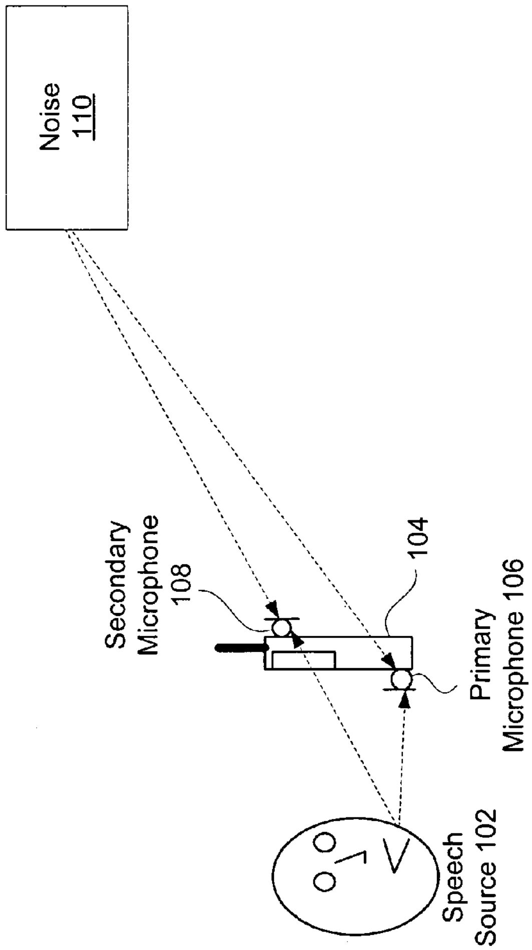
FIG. 1*a* and 1*b* are diagrams of two environments in which embodiments of the present invention may be practiced.
Figure 1B:
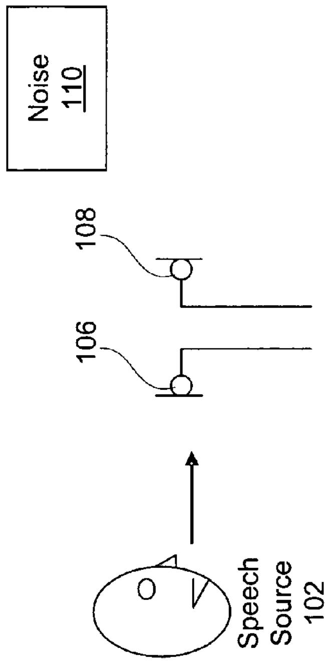

Referring to FIG. 1*a* and 1*b*, environments in which embodiments of the present invention may be practiced are shown. A user provides an audio (speech) source 102 to a communication device 104. The communication device 104 comprises at least two microphones: a primary microphone 106 relative to the audio source 102 and a secondary microphone 108 located a distance away from the primary microphone 106. In exemplary embodiments, the microphones 106 and 108 are omni-directional microphones. Alternative embodiments may utilize other forms of microphones or acoustic sensors.

While the microphones 106 and 108 receive sound information from the speech source 102, the microphones 106 and 108 also pick up noise 110. While the noise 110 is shown coming from a single location, the noise may comprise any sounds from one or more locations different than the speech and may include reverberations and echoes.

Embodiments of the present invention exploit level differences (e.g., energy differences) between the two microphones 106 and 108 independent of how the level differences are obtained. In FIG. 1*a* because the primary microphone 106 is much closer to the speech source 102 than the secondary microphone 108, the intensity level is higher for the primary microphone 106 resulting in a larger energy level during a speech/voice segment. In FIG. 1*b*, because directional response of the primary microphone 106 is highest in the direction of the speech source 102 and directional response of the secondary microphone 108 is lower in the direction of the speech source 102, the level difference is highest in the direction of the speech source 102 and lower elsewhere.

The level differences may then be used to discriminate speech and noise in the time-frequency domain. Further embodiments may use a combination of energy level difference and time delays to discriminate speech. Based on binaural cue decoding, speech signal extraction or speech enhancement may be performed.

Figure 2:
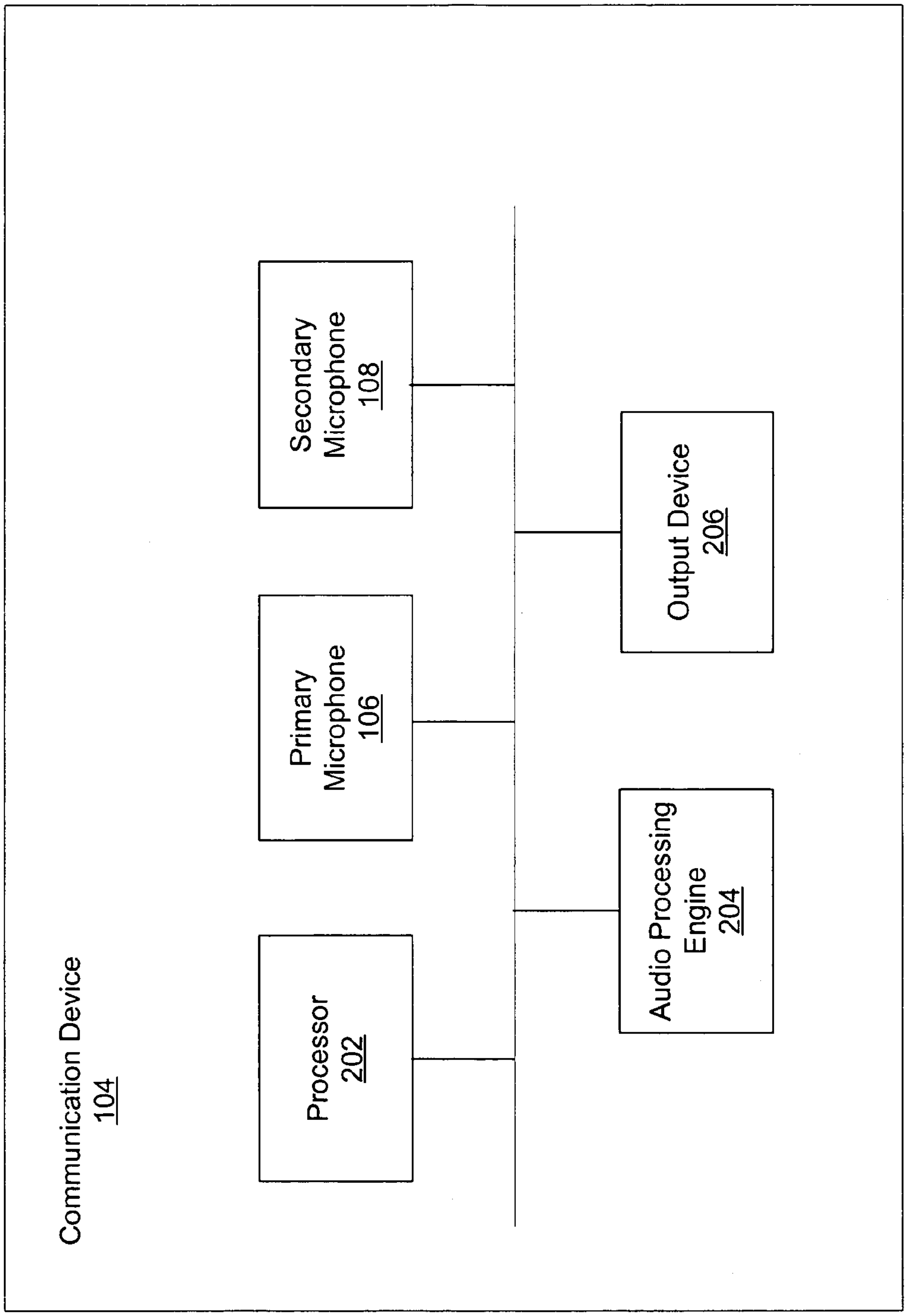
FIG. 2 is a block diagram of an exemplary communication device implementing embodiments of the present invention.

Referring now to FIG. 2, the exemplary communication device 104 is shown in more detail. The exemplary communication device 200 is an audio receiving device that comprises a processor 202, the primary microphone 106, the secondary microphone 108, an audio processing engine 204, and an output device 206. The communication device 104 may comprise further components necessary for communication device 104 operation, but not related to noise suppression or speech enhancement. The audio processing engine 204 will be discussed in more details in connection with FIG. 3.

As previously discussed, the primary and secondary microphones 106 and 108, respectively, are spaced a distance apart in order to allow for an energy level difference between them. It should be noted that the microphones 106 and 108 may comprise any type of acoustic receiving device or sensor, and may be omni-directional, unidirectional, or have other directional characteristics or polar patters. Once received by the microphones 106 and 108, the acoustic signals are converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal.

The output device 206 is any device which provides an audio output to the user. For example, the output device 206 may be an earpiece of a headset or handset, or a speaker on a conferencing device.

Figure 3:
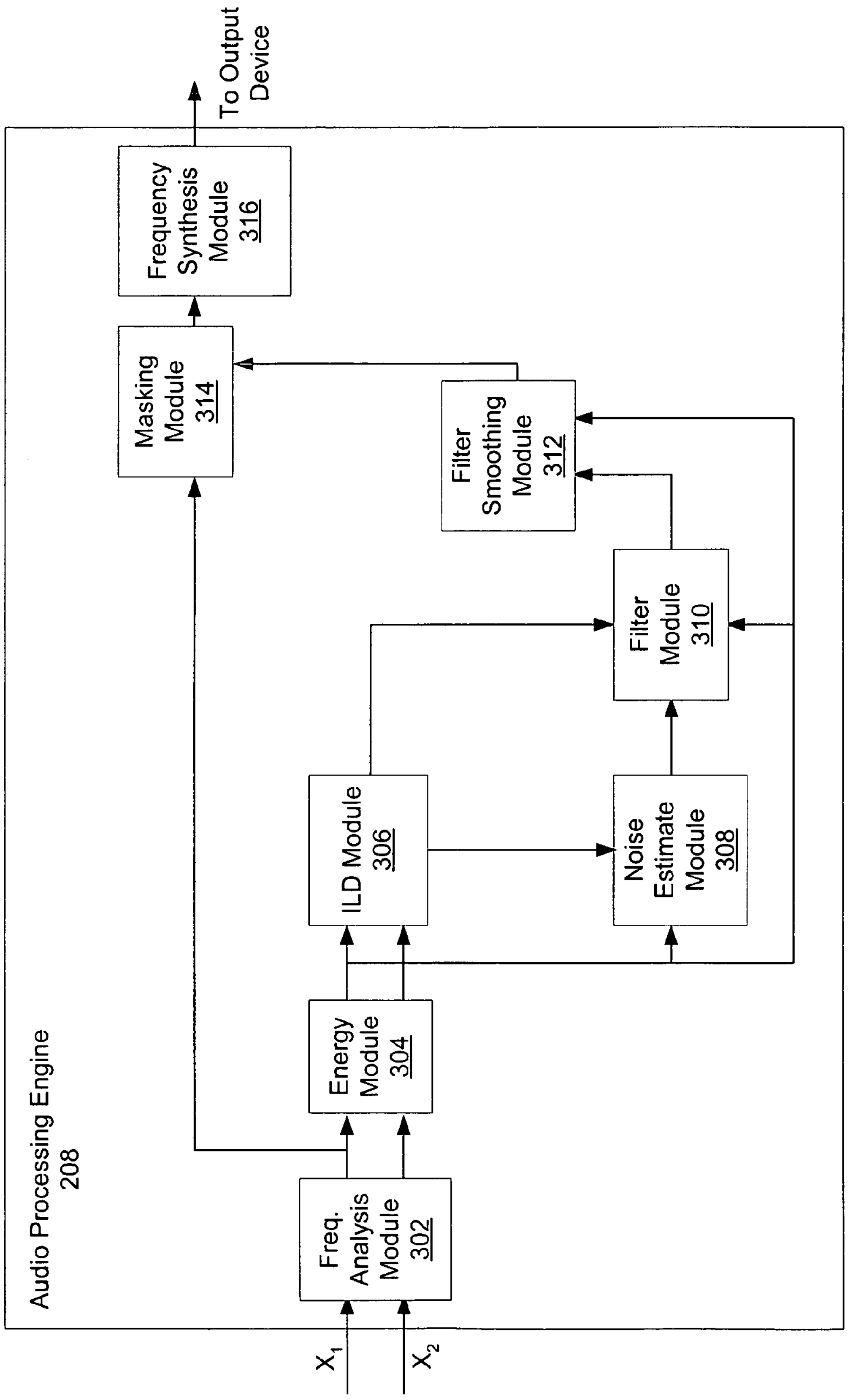
FIG. 3 is a block diagram of an exemplary audio processing engine.

FIG. 3 is a detailed block diagram of the exemplary audio processing engine 204, according to one embodiment of the present invention. In one embodiment, the acoustic signals (i.e., $X_1$ and $X_2$) received from the primary and secondary microphones 106 and 108 (FIG. 2) are converted to digital signals and forwarded to a frequency analysis module 302. In one embodiment, the frequency analysis module 302 takes the acoustic signals and mimics a cochlea implementation (i.e., cochlea domain) using a filter bank. Alternatively, other filter banks such as short-time Fourier transform (STFT), sub-band filter banks, modulated complex lapped transforms, wavelets, etc. can be used for the frequency analysis and synthesis. Because most sounds (e.g., acoustic signal) are complex and comprise more than one frequency, a sub-band analysis on the acoustic signal determines what individual frequencies are present in the complex acoustic signal during a frame (i.e., a predetermined period of time). In one embodiment, the frame is 4ms long.

Once the frequencies are determined, the signals are forwarded to an energy module 304 which computes energy level estimates during an interval of time. The energy estimate may be based on bandwidth of the cochlea channel and the acoustic signal. The exemplary energy module 304 is a component which, in some embodiments, can be represented mathematically. Thus, the energy level of the acoustic signal received at the primary microphone 106 may be approximated, in one embodiment, by the following equation $$E_1(t,\omega)=\lambda_E|X_1(t,\omega)|^2+(1-\lambda_E)E_1(t-1,\omega)$$

where $\lambda_E$ is a number between zero and one that determines an averaging time constant, $X_1(t,\omega)$ is the acoustic signal of the primary microphone 106 in the cochlea domain, ω represents the frequency, and t represents time. As shown, a present energy level of the primary microphone 106, $E_1(t,\omega)$, is dependent upon a previous energy level of the primary microphone 106, $E_1(t-1,\omega)$. In some other embodiments, the value of $\lambda_E$ can be different for different frequency channels. Given a desired time constant T (e.g., 4 ms) and the sampling frequency $f_s$ (e.g. 16 kHz), the value of $\lambda_E$ can be approximated as $$\lambda_E = 1 - e^{-\frac{1}{Tf_s}}$$

The energy level of the acoustic signal received from the secondary microphone 108 may be approximated by a similar exemplary equation $$E_2(t,\omega)=\lambda_E|X_2(t,\omega)|^2+(1-\lambda_E)E_2(t-1,\omega)$$

where $X_2(t,w)$ is the acoustic signal of the secondary microphone 108 in the cochlea domain. Similar to the calculation of energy level for the primary microphone 106, energy level for the secondary microphone 108, $E_2(t, \omega)$, is dependent upon a previous energy level of the secondary microphone 108, $E_2(t-1, \omega)$.

Given the calculated energy levels, an inter-microphone level difference (ILD) may be determined by an ILD module 306. The ILD module 306 is a component which may be approximated mathematically, in one embodiment, as $$ILD(t, \omega) = \left[1 - 2\frac{E_1(t, \omega)E_2(t, \omega)}{E_1^2(t, \omega) + E_2^2(t, \omega)}\right] * \text{sign}(E_1(t, \omega) - E_2(t, \omega))$$

where $E_1$ is the energy level of the primary microphone 106 and $E_2$ is the energy level of the secondary microphone 108, both of which are obtained from the energy module 304. This equation provides a bounded result between −1 and 1. For example, ILD goes to 1 when the $E_2$ goes to 0, and ILD goes to −1 when $E_1$ goes to 0. Thus, when the speech source is close to the primary microphone 106 and there is no noise, ILD=1, but as more noise is added, the ILD will change. Further, as more noise is picked up by both of the microphones 106 and 108, it becomes more difficult to discriminate speech from noise.

The above equation is desirable over an ILD calculated via a ratio of the energy levels, such as $$ILD(t, \omega) = \frac{E_1(t, \omega)}{E_2(t, \omega)},$$

where ILD is not bounded and may go to infinity as the energy level of the primary microphone gets smaller.

In an alternative embodiment, the ILD may be approximated by $$ILD(t, \omega) = \frac{E_1(t, \omega) - E_2(t, \omega)}{E_1(t, \omega) + E_2(t, \omega)}.$$

Here, the ILD calculation is also bounded between −1 and 1. Therefore, this alternative ILD calculation may be used in one embodiment of the present invention.

According to an exemplary embodiment of the present invention, a Wiener filter is used to suppress noise/enhance speech. In order to derive a Wiener filter estimate, however, specific inputs are required. These inputs comprise a power spectral density of noise and a power spectral density of the source signal. As such, a noise estimate module 308 may be provided to determine a noise estimate for the acoustic signals.

According to exemplary embodiments, the noise estimate module 308 attempts to estimate the noise components in the microphone signals. In exemplary embodiments, the noise estimate is based only on the acoustic signal received by the primary microphone 106. The exemplary noise estimate module 308 is a component which can be approximated mathematically by $$N(t,\omega)=\lambda_I(t,\omega)E_1(t,\omega)+(1-\lambda_I(t,\omega))\min[N(t-1,\omega),E_1(t,\omega)]$$

according to one embodiment of the present invention. As shown, the noise estimate in this embodiment is based on minimum statistics of a current energy estimate of the primary microphone 106, $E_1(t,\omega)$ and a noise estimate of a previous time frame, $N(t-1,\omega)$. Therefore the noise estimation is performed efficiently and with low latency.

$\lambda_I(t,\omega)$ in the above equation is derived from the ILD approximated by the ILD module 306, as $$\lambda_I(t,\omega)=\begin{cases}\approx 0 & \text{if } ILD(t,\omega)<\text{threshold}\\ \approx 1 & \text{if } ILD(t,\omega)>\text{threshold}\end{cases}$$

That is, when speech at the primary microphone 106 is smaller than a threshold value (e.g., threshold=0.5) above which speech is expected to be, $\lambda_I$ is small, and thus the noise estimator follows the noise closely. When ILD starts to rise (e.g., because speech is detected), however, $\lambda_I$ increases. As a result, the noise estimate module 308 slows down the noise estimation process and the speech energy does not contribute significantly to the final noise estimate. Therefore, exemplary embodiments of the present invention may use a combination of minimum statistics and voice activity detection to determine the noise estimate.

A filter module 310 then derives a filter estimate based on the noise estimate. In one embodiment, the filter is a Wiener filter. Alternative embodiments may contemplate other filters. Accordingly, the Wiener filter approximation may be approximated, according to one embodiment, as $$W=\left(\frac{P_s}{P_s+P_n}\right)^{\alpha},$$

where $P_s$ is a power spectral density of speech and $P_n$ is a power spectral density of noise. According to one embodiment, $P_n$ is the noise estimate, $N(t,\omega)$, which is calculated by the noise estimate module 308. In an exemplary embodiment, $P_s=E_1(t,\omega)-,\beta N(t,\omega)$, where $E_1(t,\omega)$ is the energy estimate of the primary microphone 106 from the energy module 304, and $N(t,\omega)$ is the noise estimate provided by the noise estimate module 308. Because the noise estimate changes with each frame, the filter estimate will also change with each frame.

$\beta$ is an over-subtraction term which is a function of the ILD. $\beta$ compensates bias of minimum statistics of the noise estimate module 308 and forms a perceptual weighting. Because time constants are different, the bias will be different between portions of pure noise and portions of noise and speech. Therefore, in some embodiments, compensation for this bias may be necessary. In exemplary embodiments, $\beta$ is determined empirically (e.g., 2-3 dB at a large ILD, and is 6-9 dB at a low ILD).

$\alpha$ in the above exemplary Wiener filter equation is a factor which further suppresses the noise estimate. $\alpha$ can be any positive value. In one embodiment, nonlinear expansion may be obtained by setting $\alpha$ to 2. According to exemplary embodiments, $\alpha$ is determined empirically and applied when a body of $$W=\left(\frac{P_s}{P_s+P_n}\right)$$

falls below a prescribed value (e.g., 12 dB down from the maximum possible value of W, which is unity).

Because the Wiener filter estimation may change quickly (e.g., from one frame to the next frame) and noise and speech estimates can vary greatly between each frame, application of the Wiener filter estimate, as is, may result in artifacts (e.g., discontinuities, blips, transients, etc.). Therefore, an optional filter smoothing module 312 is provided to smooth the Wiener filter estimate applied to the acoustic signals as a function of time. In one embodiment, the filter smoothing module 312 may be mathematically approximated as $$M(t,\omega)=\lambda_s(t,\omega)W(t,\omega)+(1-\lambda_s(t,\omega))M(t-1,\omega),$$

where $\lambda_s$ is a function of the Wiener filter estimate and the primary microphone energy, $E_1$.

As shown, the filter smoothing module 312, at time (t) will smooth the Wiener filter estimate using the values of the smoothed Wiener filter estimate from the previous frame at time (t-1). In order to allow for quick response to the acoustic signal changing quickly, the filter smoothing module 312 performs less smoothing on quick changing signals, and more smoothing on slower changing signals. This is accomplished by varying the value of $\lambda_s$ according to a weighed first order derivative of $E_1$ with respect to time. If the first order derivative is large and the energy change is large, then $\lambda_s$ is set to a large value. If the derivative is small then $\lambda_s$ is set to a smaller value.

After smoothing by the filter smoothing module 312, the primary acoustic signal is multiplied by the smoothed Wiener filter estimate to estimate the speech. In the above Wiener filter embodiment, the speech estimate is approximated by $S(t,\omega)=X_1(t,\omega)*M(t,\omega)$, where $X_1$ is the acoustic signal from the primary microphone 106. In exemplary embodiments, the speech estimation occurs in a masking module 314.

Next, the speech estimate is converted back into time domain from the cochlea domain. The conversion comprises taking the speech estimate, $S(t,\omega)$, and multiplying this with an inverse frequency of the cochlea channels in a frequency synthesis module 316. Once conversion is completed, the signal is output to user.

It should be noted that the system architecture of the audio processing engine 204 of FIG. 3 is exemplary. Alternative embodiments may comprise more components, less components, or equivalent components and still be within the scope of embodiments of the present invention. Various modules of the audio processing engine 208 may be combined into a single module. For example, the functionalities of the frequency analysis module 302 and energy module 304 may be combined into a single module. Furthermore, the functions of the ILD module 306 may be combined with the functions of the energy module 304 alone, or in combination with the frequency analysis module 302. As a further example, the functionality of the filter module 310 may be combined with the functionality of the filter smoothing module 312.

Figure 4:
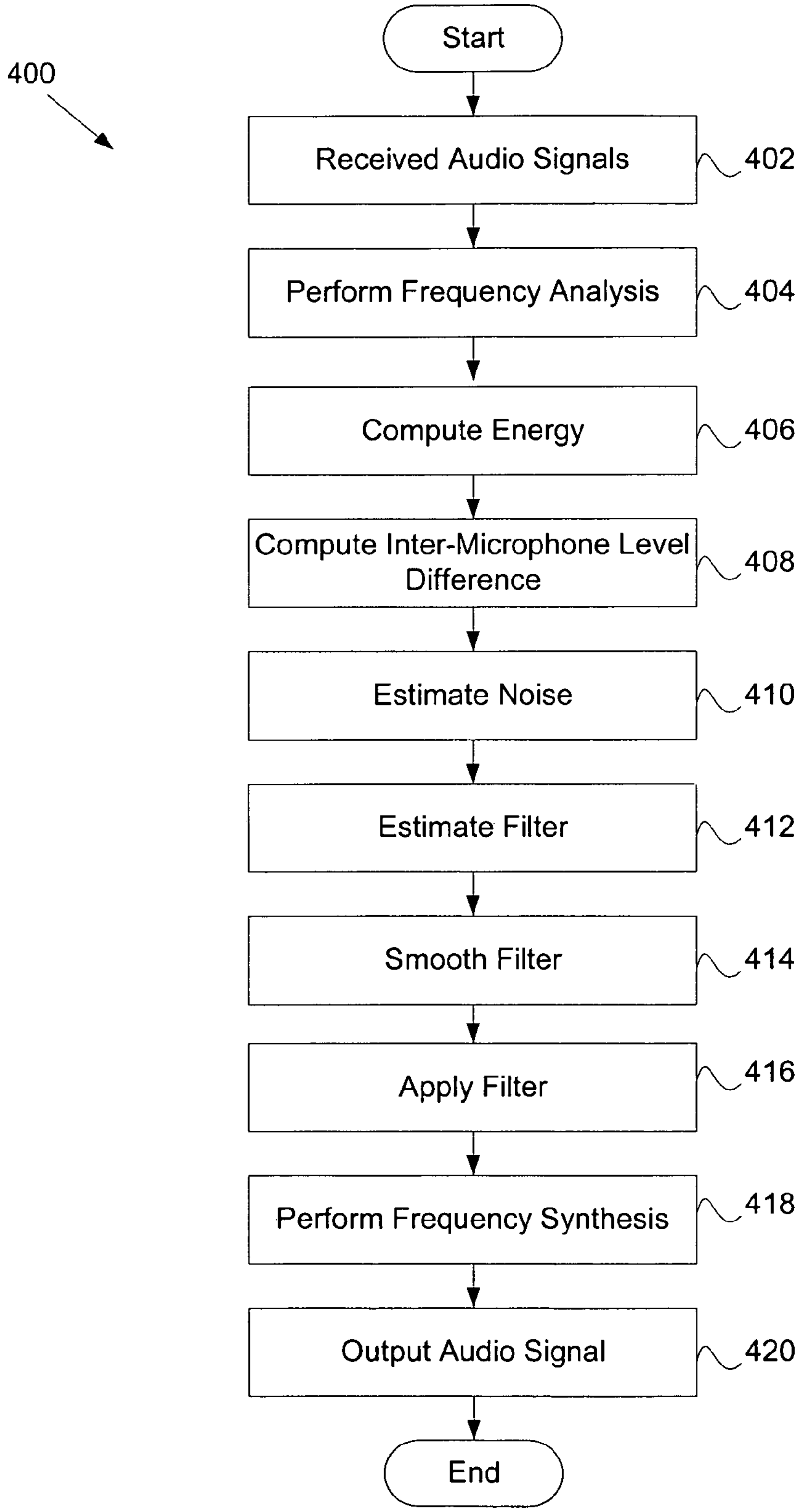
FIG. 4 is a flowchart of an exemplary method for utilizing inter-microphone level differences to enhance speech.

Referring now to FIG. 4, a flowchart 400 of an exemplary method for noise suppression utilizing inter-microphone level differences is shown. In step 402, audio signals are received by a primary microphone 106 and a secondary microphone 108 (FIG. 2). In exemplary embodiments, the acoustic signals are converted to digital format for processing.

Frequency analysis is then performed on the acoustic signals by the frequency analysis module 302 (FIG. 3) in step 404. According to one embodiment, the frequency analysis module 302 utilizes a filter bank to determine individual frequencies present in the complex acoustic signal.

In step 406, energy estimates for acoustic signals received at both the primary and secondary microphones 106 and 108 are computed. In one embodiment, the energy estimates are determined by an energy module 304 (FIG. 3). The exemplary energy module 304 utilizes a present acoustic signal and a previously calculated energy estimate to determine the present energy estimate.

Once the energy estimates are calculated, inter-microphone level differences (ILD) are computed in step 408. In one embodiment, the ILD is calculated based on the energy estimates of both the primary and secondary acoustic signals. In exemplary embodiments, the ILD is computed by the ILD module 306 (FIG. 3).

Based on the calculated ILD, noise is estimated in step 410. According to embodiments of the present invention, the noise estimate is based only on the acoustic signal received at the primary microphone 106. The noise estimate may be based on the present energy estimate of the acoustic signal from the primary microphone 106 and a previously computed noise estimate. In determining the noise estimate, the noise estimation is frozen or slowed down when the ILD increases, according to exemplary embodiments of the present invention.

Instep 412, a filter estimate is computed by the filter module 310 (FIG. 3). In one embodiment, the filter used in the audio processing engine 204 (FIG. 3) is a Wiener filter. Once the filter estimate is determined, the filter estimate may be smoothed in step 414. Smoothing prevents fast fluctuations which may create audio artifacts. The smoothed filter estimate is applied to the acoustic signal from the primary microphone 106 in step 416 to generate a speech estimate.

In step 418, the speech estimate is converted back to the time domain. Exemplary conversion techniques apply an inverse frequency of the cochlea channel to the speech estimate. Once the speech estimate is converted, the audio signal may now be output to the user in step 420. In some embodiments, the digital acoustic signal is converted to an analog signal for output. The output may be via a speaker, earpieces, or other similar devices.

The above-described modules can be comprised of instructions that are stored on storage media. The instructions can be retrieved and executed by the processor 202 (FIG. 2). Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A method for enhancing speech, comprising:

receiving a primary acoustic signal at a primary microphone and a secondary acoustic signal at a secondary microphone;

executing an audio processing engine by a processor to perform frequency analysis on the received acoustic signals to generate a primary acoustic spectrum signal and a secondary acoustic spectrum signal, the primary acoustic spectrum signal and the secondary acoustic spectrum signal each comprising a plurality of sub-bands;

determining a filter estimate for each of the plurality of sub-bands of the primary acoustic spectrum signal during a frame, the filter estimate for each sub-band based on:

(i) a noise estimate for the particular sub-band of the primary acoustic spectrum signal;

(ii) an energy estimate for the particular sub-band of the primary acoustic spectrum signal; and (iii) an inter-microphone level difference for the particular sub-band, the inter-microphone level difference for the particular sub-band being based on the energy estimate for the particular sub-band of the primary acoustic spectrum signal and an energy estimate for the particular sub-band of the secondary acoustic spectrum signal; and applying the filter estimate for the particular sub-band of the primary acoustic spectrum signal to the corresponding sub-band of the primary acoustic spectrum signal to produce a speech estimate.

2. The method of claim 1 wherein the energy estimate for the particular sub-band of the primary acoustic spectrum signal is approximated as $E_1(t,\omega)=\lambda_E|X_1(t,\omega)|^2+(1-\lambda_E)E_1(t-1,\omega)$.

3. The method of claim 1 wherein the energy estimate for the particular sub-band of the secondary acoustic spectrum signal is approximated as $E_2(t,\omega)=\lambda_E|X_2(t,\omega)|^2+(1-\lambda_E)E_2(t-1,\omega)$.

4. The method of claim 1 wherein the inter-microphone level difference is approximated by $$ILD(t,\omega)=\left[1-2\frac{E_1(t,\omega)E_2(t,\omega)}{E_1^2(t,\omega)+E_2^2(t,\omega)}\right]*\mathrm{sign}(E_1(t,\omega)-E_2(t,\omega)).$$

5. The method of claim 1 wherein the inter-microphone level difference is approximated by $$ILD(t,\omega)=\frac{E_1(t,\omega)-E_2(t,\omega)}{E_1(t,\omega)+E_2(t,\omega)}.$$

6. The method of claim 1 wherein the noise estimate is based on an energy estimate of the primary acoustic spectrum signal and the inter-microphone level difference for the particular sub-band.

7. The method of claim 6 wherein the noise estimate is approximated as $N(t, \omega)=\lambda_1(t, \omega)E_1(t, \omega)+(1-\lambda_1(t, \omega))\min[N(t-1, \omega), E_1(t, \omega)]$.

8. The method of claim 1 further comprising smoothing the filter estimate prior to applying the filter estimate to the primary acoustic spectrum signal.

9. The method of claim 8 wherein the smoothing is approximated as $M(t,\omega)=\lambda_s(t,\omega)W(t, \omega)+(1-\lambda_s(t,\omega))M(t-1, \omega)$.

10. The method of claim 1 further comprising converting the speech estimate to a time domain.

11. The method of claim 1 further comprising outputting the speech estimate to a user.

12. The method of claim 1 wherein the filter estimate is based on a Wiener filter.

13. A system for enhancing speech on a device, comprising:
- a primary microphone configured to receive a primary acoustic signal;
- a secondary microphone located a distance away from the primary microphone and configured to receive a secondary acoustic signal; and
- an audio processing engine configured to enhance speech received at the primary microphone, the audio processing engine comprising:
  - a frequency analysis module configured to perform frequency analysis on the received acoustic signals to generate a primary acoustic spectrum signal and a secondary acoustic spectrum signal, the primary acoustic spectrum signal and the secondary acoustic spectrum signal each comprising a plurality of sub-bands;
  - a noise estimate module configured to determine a noise estimate for each of the plurality of sub-bands of the primary acoustic spectrum signal based on an energy estimate for each corresponding sub-band of the primary acoustic spectrum signal and an inter-microphone level difference for each corresponding sub-band, the inter-microphone level difference for each corresponding sub-band based on the energy estimate for each corresponding sub-band of the primary acoustic spectrum signal and an energy estimate for each corresponding sub-band of the secondary acoustic spectrum signal; and
  - a filter module configured to determine a filter estimate for each of the plurality of sub-bands of the primary acoustic spectrum signal to be applied to the primary acoustic spectrum signal to generate a filtered acoustic signal, the filter estimate for each corresponding sub-band based on
  - (i) the noise estimate for each corresponding sub-band of the primary acoustic spectrum signal;
  - (ii) the energy estimate for each corresponding sub-band of the primary acoustic spectrum signal; and
  - (iii) the inter-microphone level difference for each corresponding sub-band.

14. The system of claim 13 wherein the audio processing engine further comprises an inter-microphone level difference module configured to determine the inter-microphone level difference.

15. The system of claim 13 wherein the audio processing engine further comprises a filter smoothing module configured to smooth the filter estimate prior to applying the filter estimate to the primary acoustic spectrum signal.

16. The system of claim 13 wherein the audio processing engine further comprises a masking module configured to determine the speech estimate.

17. A non-transitory computer readable medium having embodied thereon a program, the program being executable by a machine to perform a method for enhancing speech on a device, the method comprising:
- receiving a primary acoustic signal at a primary microphone and a secondary acoustic signal at a secondary microphone;
- performing frequency analysis to generate a primary acoustic spectrum signal and a secondary acoustic spectrum signal, the primary acoustic spectrum signal and the secondary acoustic spectrum signal each comprising a plurality of sub-bands;
- determining an energy estimate for each of the plurality of sub-bands over a frame for each of the acoustic spectrum signals;
- using the energy estimates to determine an inter-microphone level difference for each of the plurality of sub-bands of the primary acoustic spectrum signal for the frame, the inter-microphone level difference for each of the plurality of sub-bands of the primary acoustic spectrum signal based on the energy estimate for the corresponding sub-band of the primary acoustic spectrum signal and an energy estimate for the corresponding sub-band of the secondary acoustic spectrum signal;
- generating a noise estimate for each of the plurality of sub-bands of the primary acoustic spectrum signal based on the energy estimate for the corresponding sub-band of the primary acoustic spectrum signal and the inter-microphone level difference for the corresponding sub-band;
- calculating a filter estimate for each of the plurality of sub-bands of the primary acoustic spectrum signal based on:
  - (i) the noise estimate for the corresponding sub-band;
  - (ii) the energy estimate for the corresponding sub-band of the primary acoustic spectrum signal; and
  - (iii) the inter-microphone level difference for the corresponding sub-band; and
- applying the filter estimate for each of the plurality of sub-bands of the primary acoustic spectrum signal to the corresponding sub-band of the primary acoustic spectrum signal to produce a speech estimate.

18. A method for enhancing speech, comprising:
- receiving a primary acoustic signal at a primary microphone and a secondary acoustic signal at a secondary microphone;
- executing an audio processing engine by a processor to perform frequency analysis on the received acoustic signals to generate a primary acoustic spectrum signal and a secondary acoustic spectrum signal, the primary acoustic spectrum signal and the secondary acoustic spectrum signal each comprising a plurality of sub-bands;
- determining a filter estimate for each of the plurality of sub-bands of the primary acoustic spectrum signal during a frame, the filter estimate for a particular sub-band based on:
  - (i) an inter-microphone level difference for the particular sub-band, the inter-microphone level difference for the particular sub-band being based on an energy estimate for the particular sub-band of the primary acoustic spectrum signal and an energy estimate for the particular sub-band of the secondary acoustic spectrum signal;
  - (ii) a noise estimate for the particular sub-band of the primary acoustic spectrum signal, the noise estimate being separately based on the energy estimate for the particular sub-band of the primary acoustic spectrum signal and separately based on the inter-microphone level difference for the particular sub-band; and (iii) the energy estimate for the particular sub-band of the primary acoustic spectrum signal; and applying the filter estimate for the particular sub-band to the corresponding sub-band of the primary acoustic spectrum signal to produce a speech estimate.

19. The method of claim 18 further comprising smoothing the filter estimate prior to applying the filter estimate to the primary acoustic spectrum signal.

20. The method of claim 18 further comprising converting the speech estimate to a time domain.

21. The method of claim 18 further comprising outputting the speech estimate to a user.

* * * * *